3,129,170
PROCESS FOR THE CLARIFICATION OF AN ACIDIC INORGANIC PHOSPHATIC SOLUTION
Rudolf Ittlinger, Lakeland, Fla., assignor to International Minerals & Chemical Corporation, a corporation of New York
No Drawing. Filed Oct. 25, 1960, Ser. No. 64,720
16 Claims. (Cl. 210—54)

This invention generally relates to acidic phosphatic solutions. More particularly the invention relates to a process for the efficient separation of suspended, solid impurities from solutions of inorganic, acidic phosphatic materials such as those formed from acidulated phosphate rock.

In conventional methods for the production of aqueous solution of inorganic acidic phosphatic materials, the reaction product which results from reacting phosphate rock with sulfuric acid is filtered and water leached to yield a crude aqueous acidic phosphatic solution product in which is suspended a substantial quantity of solid impurities. The so-called wet process phosphoric acid of commerce is produced in such a process.

The problems occasioned by suspended solid impurities are particularly acute with respect to wet process phosphoric acid. Conventional practice yields a crude wet process phosphatic acid containing from about 15% to about 30% by weight of phosphorus pentoxide ($P_2O_5$) and a substantial portion of suspended solid impurities which do not readily settle. Such crude, dilute wet process acid is normally concentrated to increase the $P_2O_5$ content to at least about 45% by weight and more frequently to at least 50% by weight. The resultant concentrated acid is usually very dark, sometimes almost black, in color. The concentration procedure necessarily also serves to proportionately increase the quantity of suspended solid impurities and yields concentrated acid solutions frequently containing from about 15% to about 30% by volume of suspended solids, which solids are particularly difficult to remove from the solution.

In general, it has been determined that the impurities present in wet process acidic phosphatic solutions, such as wet process phosphoric acid, comprise calcium sulfate hemihydrate, iron and aluminum phosphates, and double salts of iron and aluminum phosphates with phosphoric acid. Organic compounds and other organic materials are also present.

Upon standing in storage or during shipment in tank cars or the like, such acidic phosphatic solutions deposit a layer of solid matter which renders handling of the stored or shipped acid exceedingly difficult and frequently economically unfeasible.

The removal of suspended solid impurities from wet process phosphatic solutions as contemplated by this invention differs fundamentally from the defluorination of similar phosphatic solutions. The present invention, which may only incidentally reduce the fluorine content of the acidic phosphatic solution treated, is applicable to remove suspended solids from either defluorinated or undefluorinated aqueous solutions of inorganic phosphates.

It is, accordingly, an object of the present invention to provide a method for removing suspended solid impurities from acidic inorganic phosphatic solutions.

It is a further important object of the invention to provide a method effective to increase significantly the settling rate of solids suspended in wet process phosphoric acid and similar solutions of acidic inorganic phosphatic materials.

It is another important object of the invention to provide a wet process phosphoric acid sufficiently free of suspended solid impurities so that it may be shipped or stored over an extended period of time without appreciable precipitation or sedimentation.

It is an additional object of the invention to provide an economical process for the clarification of wet process phosphoric acid.

It is a more specific object of the invention to provide a process which entails the utilization of only nontoxic, noncorrosive, non-fume forming reagents for the clarification of wet process phosphoric acid.

It is a further specific object of the invention to provide a process for the clarification of concentrated wet process phosphoric acid which is appropriate for installation in a conventional wet process phosphoric acid plant.

These and other objects and advantages of the present invention will be apparent from the description of the invention.

Now, in accordance with the invention, it has been discovered that acidic inorganic phosphatic solutions containing suspended solid impurities can efficiently be clarified by mixing said solutions with an amine clarification agent, said clarification agent being employed in a minor amount effective to increase the settling rate of said suspended solids and thereafter separating a clarified fraction.

The amine clarification agents generally comprise relatively water insoluble amines. Useful amine clarification agents are the amine-type cationic collectors which are used in flotation processes for the beneficiation of ores. Preferred agents are high molecular weight aliphatic amines containing from about 14 to 20 carbon atoms and mixtures containing these amines. High molecular weight primary aliphatic amines, such as n-lauryl amine, as well as mixtures containing primary aliphatic amines may be used. Other useful agents are the acid addition salts of aliphatic amines, preferably the acetate and hydrochlorides, for example, octadecyl amine acetate, hexadecyl amine hydrochloride, and the like, as well as quaternary ammonium salts of aliphatic amines. Mixtures of amines and amine salts may be used as well as crude amines such as tallow oil amines, coconut oil amines, and soya oil amines, as well as fractions of such amines. The preferred amines are relatively insoluble in water, however they are water dispersible. High molecular weight aliphatic amines and salts thereof and crude amines and fractions thereof are commercially available.

The amine clarification agents are effective to some degree in substantially all proportions such that the relative amounts thereof utilized do not constitute an essential feature of the invention. In general, the rate of clarification or settling of solids varies directly with the amount of amine clarification agent utilized. The practical upper limit of clarification agent concentration is determined to a significant extent by economic considerations including amine reagent cost, cost of separation of precipitated solids from the clarified acidic solution and dilution of the solution treated. Normally, the amine clarification agents are employed in a minor proportion requisite to provide from about 0.005 to about 50 pounds and preferably from about 0.1 to about 10 pounds of amine agent per ton of acidic solution to be clarified.

The amine clarification agents may tend to form agglomerates or lumps when mixed with strong acids. Accordingly, conventional expedients to effect uniform dispersion of the amine agent in the acidic phosphatic solution with a minimum formation of large particles are appropriately utilized. Such expedients include, inter alia, relatively slow addition of the amine reagent to the acidic solution treated accompanied by vigorous agitation. The amine compound is preferably in a dispersed form in aqueous solution and, therefore, it is preferable to make up an aqueous emulsion of suspension of the amine and to add the amine emulsion or suspension to the acidic phosphatic solution. The emulsion or suspension may readily be made by using a high speed blender.

The process of the invention can be practiced under any desired temperature conditions. The settling rate of the suspended solids and the quantity of solids remaining the clarified acid are, however, both directly in proportion to the treatment and settling temperature. Accordingly, the practice of the invention at elevated temperatures is preferred. The upper temperature limit is determined primarily by the temperature of decomposition or degradation of the amine clarification agent utilized. Hence, the invention generally contemplates operation at all temperautres at which the amine clarification agent utilized is stable. The clarification procedure is preferably performed at temperatures within the range of from about 120° F. to about 250° F., and more preferably from about 175° F. to about 250° F. However, as herein set forth, higher or lower temperatures may be used. Generally, lower temperatures increase the viscosity of the solution with consequent reduction in the settling rate.

The process of the invention is effective in the clarification of acidic phosphatic solutions in all concentrations. Acid phosphate solutions formed by the leaching of phosphate rock may constitute substantially calcium free phosphoric acid, or, depending upon the degree of acidulation, approach monocalcium phosphate solutions characterized by a $CaO/P_2O_5$ mole ratio of about 1:1. The invention is useful in the clarification of all such solutions and more specifically is applicable to acidic phosphatic solutions ranging from phosphorus acid to monocalcium phosphate. The problems which attend the clarification of acidic phosphatic solutions containing in excess of about forty-five percent by weight of $P_2O_5$ is particularly acute and the invention finds important utility in the efficient clarification of such materials. Wet process phosphoric acid having a $P_2O_5$ weight concentration between about 52% and about 56% is effectively clarified using the process of this invention.

Conventional commercial flocculating agents, stable in concentrated mineral acids, and specifically stable in the acidic phosphatic solution being treated, may also be utilized with the amine clarifying agent of this invention, to expedite the solids settling rate and yield clarified acidic solutions containing a comparatively smaller amount of residual solid impurities. Flocculating agents suitable for such utilization include water-soluble high molecular weight synthetic polymers such as the polyacrylamides which are sold under the commercial trade name "Separan," guar, the hydrolyzed polyacrylonitrile resins or the salts thereof such as the sodium and potassium salts, and the like. Such commercial flocculating agents are employed in the conventional manner normally in water solution, in about 0.05 to about 2% by weight, in an amount requisite to provide from about 0.001 to about 2 pounds thereof per ton of acidic phosphatic solution treated, and more preferably from about 0.003 to about 0.5 pound per ton of acidic phosphatic solution treated.

After the addition of the amine containing clarification agent, and after the addition of the flocculating agent, when used, the mixture is handled in a manner to permit the solids to settle out to produce a clarified fraction and a solids-carrying fraction. The mixture may be maintained quiescent thereby permitting the solids to settle or the mixture may be centrifuged thereby settling the solids. Other methods of settling solids in a liquid may, of course, be used.

The sludge or solids layer resulting from the clarification of acidic phosphatic solutions in accordance with this invention contains a substantial proportion of $P_2O_5$ and is useful, inter alia, in the manufacture of fertilizers and particularly as a binding agent for the manufacture of granulated phosphatic fertilizers.

In order to give a fuller understanding of the invention, but with no intention to be limited thereto, the following specific example is given.

*Example*

Three 200 gram samples, designated A, B, and C, of fresh concentrated wet process phosphoric acid having a $P_2O_5$ content of about 54% were placed in 200 milliliter graduates. The acid in each graduate was maintained at 212° F. during the entire testing period.

Sample A was clarified pursuant to the invention. To sample A, 0.25 ml. of a 10% emulsion of a mixture of primary aliphatic amines of 8–18 carbon atoms was added to the mixture and vigorously agitated. Afterwards the graduate and its contents were maintained quiescent and the settling was determined by measuring the depth of clarified acid after specified time intervals.

Sample B was clarified with the aid of a commercially available flocculant. To sample B, 3 ml. of a solution of a commercial high molecular weight polyacrylamide polymer flocculant sold under the trade name, "Separan 2610" was added in the form of a 0.2% water solution.

Sample C was utilized as control, with nothing being added to the sample.

The results of the tests are indicated below in the table.

| Sample | Additive Conc., Pound Per Ton of Acid | Volume Percent Clarified Acid | | |
|---|---|---|---|---|
| | | 24 Hrs. | 48 Hrs. | 192 Hrs. |
| A | 0.24 | 49.1 | 59.1 | 71.4 |
| B | 0.06 | 23.8 | 37.7 | 57.4 |
| C | 0.00 | 4.6 | 8.0 | 49.1 |

The supernatant clarified acid of sample A contained substantially no solids. The supernatant clarified acid of sample B, however, was still turbid and contained some visible solids.

The invention, as illustrated by the foregoing example, affords an efficient and economical method for the rapid clarification of wet process acidic phosphatic solutions. The clarified product is of good quality and the sludge or solids material formed finds utility in the fertilizer industry. The invention accordingly represents a significant contribution to the art.

The description of the invention utilized specific reference to certain process details; however, it is to be understood that such details are illustrative only and not by way of limitation. Other modifications and equivalents of the invention will be apparent to those skilled in the art from the foregoing description.

I claim:

1. A process for the clarification of an acidic inorganic phosphatic solution containing suspended solid impurities which comprises mixing said solution with a clarification agent comprising an amine clarification agent selected from the group consisting of substantially water insoluble aliphatic amines, acid addition salts of aliphatic amines, quaternary ammonium salts of aliphatic amines, and mixtures thereof, said clarification agent being employed in a minor proportion effective to increase the settling rate of said suspended solids, and thereafter separating a clarified fraction.

2. The process of claim 1 wherein the acidic phosphatic solution is obtained by the aqueous leaching of acidulated phosphate rock.

3. The process of claim 1 wherein the acidic phosphatic solution is wet process phosphoric acid.

4. The process of claim 1 wherein said amine clarification agent comprises a crude amine.

5. The process of claim 1 wherein said amine clarification agent comprises a primary aliphatic amine having from about 8 to about 20 carbon atoms.

6. The process of claim 1 wherein said amine clarification agent is employed in an amount requisite to provide from about 0.005 to about 50 pounds thereof per ton of acidic inorganic phosphatic solution treated.

7. The process of claim 1 wherein said amine clarification agent is employed in an amount requisite to provide from about 0.1 to about 10 pounds thereof per ton of acidic inorganic phosphatic solution treated.

8. The process of claim 1 wherein said acidic phosphatic solution is wet process phosphoric acid containing at least about 45% by weight of $P_2O_5$.

9. A process for the clarification of an acidic inorganic phosphatic solution containing suspended solid impurities which comprises agitating said solution with a clarificaiton agent comprising an amine clarification agent selected from the group consisting of substantially water insoluble aliphatic amines, acid addition salts of aliphatic amines, quaternary ammonium salts of aliphatic amines, and mixtures thereof, said clarification agent being employed in a minor proportion effective to increase the settling rate of said suspended solids, thereafter maintaining the mixture so produced quiescent to settle at least a substantial portion of said solids, and separating the clarified supernatant solution from said settled impurities.

10. The process of claim 9 wherein the acidic phosphatic solution is obtained by the aqueous leaching of acidulated phosphate rock.

11. The process of claim 9 wherein the acidic phosphatic solution is wet process phosphoric acid.

12. The process of claim 9 wherein said amine clarification agent comprises a crude amine.

13. The process of claim 9 wherein said amine clarification agent comprises a primary aliphatic amine having from about 8 to about 20 carbon atoms.

14. The process of claim 9 wherein said clarification agent is employed in an amount requisite to provide from about 0.005 to about 50 pounds thereof per ton of acidic inorganic phosphatic solution treated.

15. The process of claim 9 wherein said clarification agent is employed in an amount requisite to provide from about 0.1 to about 10 pounds thereof per ton of acidic inorganic phosphatic solution treated.

16. The process of claim 9 wherein said acidic phosphatic solutions is wet process phosphoric acid containing at least about 45% by weight of $P_2O_5$.

References Cited in the file of this patent

UNITED STATES PATENTS

| | | |
|---|---|---|
| 2,222,728 | Tartaron | Nov. 26, 1940 |
| 2,315,734 | Ralston et al. | Apr. 6, 1943 |
| 2,335,209 | Booth | Nov. 23, 1943 |
| 2,509,261 | Carosella | May 30, 1950 |
| 2,960,535 | Bylsma | Nov. 15, 1960 |
| 2,968,528 | Tuttle | Jan. 17, 1961 |
| 2,975,123 | Head | Mar. 14, 1961 |